United States Patent
Gambera et al.

(10) Patent No.: US 9,677,896 B2
(45) Date of Patent: Jun. 13, 2017

(54) PREVENTIVE FUEL SAVING-AIMED MOTOR VEHICLE DRIVER ASSISTANCE

(71) Applicant: C.R.F. Società Consortile per Azioni, Orbassano (IT)

(72) Inventors: Mario Gambera, Orbassano (IT); Paolo Capano, Orbassano (IT)

(73) Assignee: C.R.F. Societa' Consortile per Azioni, Orbassano (IT)

(*) Notice: Subject to any disclaimer, the term of this patent is extended or adjusted under 35 U.S.C. 154(b) by 0 days.

(21) Appl. No.: 14/891,586

(22) PCT Filed: May 15, 2014

(86) PCT No.: PCT/IB2014/061474
§ 371 (c)(1),
(2) Date: Nov. 16, 2015

(87) PCT Pub. No.: WO2014/184773
PCT Pub. Date: Nov. 20, 2014

(65) Prior Publication Data
US 2016/0123755 A1    May 5, 2016

(30) Foreign Application Priority Data
May 15, 2013 (EP) .................................. 13425074

(51) Int. Cl.
*G01C 21/34* (2006.01)
*B60W 40/09* (2012.01)
(Continued)

(52) U.S. Cl.
CPC ......... *G01C 21/3469* (2013.01); *B60W 40/09* (2013.01); *B60W 50/0097* (2013.01);
(Continued)

(58) Field of Classification Search
CPC    G01C 21/3469; G01C 21/26; G01C 24/3697; B60W 40/09; B60W 50/0097; B60W 50/14
(Continued)

(56) References Cited

U.S. PATENT DOCUMENTS

| | | | |
|---|---|---|---|
| 7,054,745 B1* | 5/2006 | Couckuyt | G01C 21/26 340/995.27 |
| 2007/0027593 A1* | 2/2007 | Shah | B60W 50/00 701/29.4 |
| 2015/0088414 A1* | 3/2015 | Mason | G01C 21/3469 701/423 |

FOREIGN PATENT DOCUMENTS

| | | |
|---|---|---|
| EP | 1 973 078 A1 | 9/2008 |
| EP | 2 320 387 A1 | 5/2011 |

(Continued)

*Primary Examiner* — Yazan Soofi
(74) *Attorney, Agent, or Firm* — Blank Rome LLP

(57) ABSTRACT

A fuel saving-aimed motor vehicle driver assistance system configured to receive and process motor vehicle-related data and motor vehicle position-related data to identify recurrent routes of a motor vehicle and to provide a motor vehicle driver, via an automotive human-machine interface, with motor vehicle driving assistance recommendations for fuel saving along the routes. The motor vehicle driver assistance system is configured to identify recurrent routes of the motor vehicle by determining a succession of geographic points, referred to as Waypoints, along a route of the motor vehicle, at which values of a series of physical quantities are determined and recorded, which define the attributes of the Waypoints. The Waypoint attributes are then updated when the vehicle travels through them. For each current motor vehicle position, a search is made for the Waypoint spatially closest to the current motor vehicle position and having certain characteristics, such that if such a Waypoint is not found, then a new Waypoint is defined, or else, if such a
(Continued)

Waypoint is found, then variable Waypoint attributes are updated. The so-defined Waypoints are then concatenated so as to form an ordered list of Waypoints belonging to the same recurrent route. The characteristic points of the routes, such as bends, roundabouts and traffic lights, are identified and optimal speed profiles and primary controls for the motor vehicle at the characteristic points are computed. Based on the computed optimal speed profiles and primary controls and by means of the automotive human-machine interface, the motor vehicle driver is then provided with motor vehicle driving recommendations for fuel saving along the routes.

14 Claims, 1 Drawing Sheet

(51) Int. Cl.
    *G01C 21/26*     (2006.01)
    *G01C 21/36*     (2006.01)
    *B60W 50/14*     (2012.01)
    *B60W 50/00*     (2006.01)

(52) U.S. Cl.
    CPC ............. *B60W 50/14* (2013.01); *G01C 21/26* (2013.01); *G01C 21/3697* (2013.01); *B60W 2050/0089* (2013.01); *B60W 2530/18* (2013.01); *B60W 2550/143* (2013.01); *B60W 2550/146* (2013.01); *B60W 2550/402* (2013.01); *Y02T 10/84* (2013.01)

(58) Field of Classification Search
    USPC .......................................................... 701/70
    See application file for complete search history.

(56) References Cited

FOREIGN PATENT DOCUMENTS

| | | |
|---|---|---|
| GB | 2 432 437 A | 5/2007 |
| WO | WO 00/07150 A1 | 2/2000 |

* cited by examiner

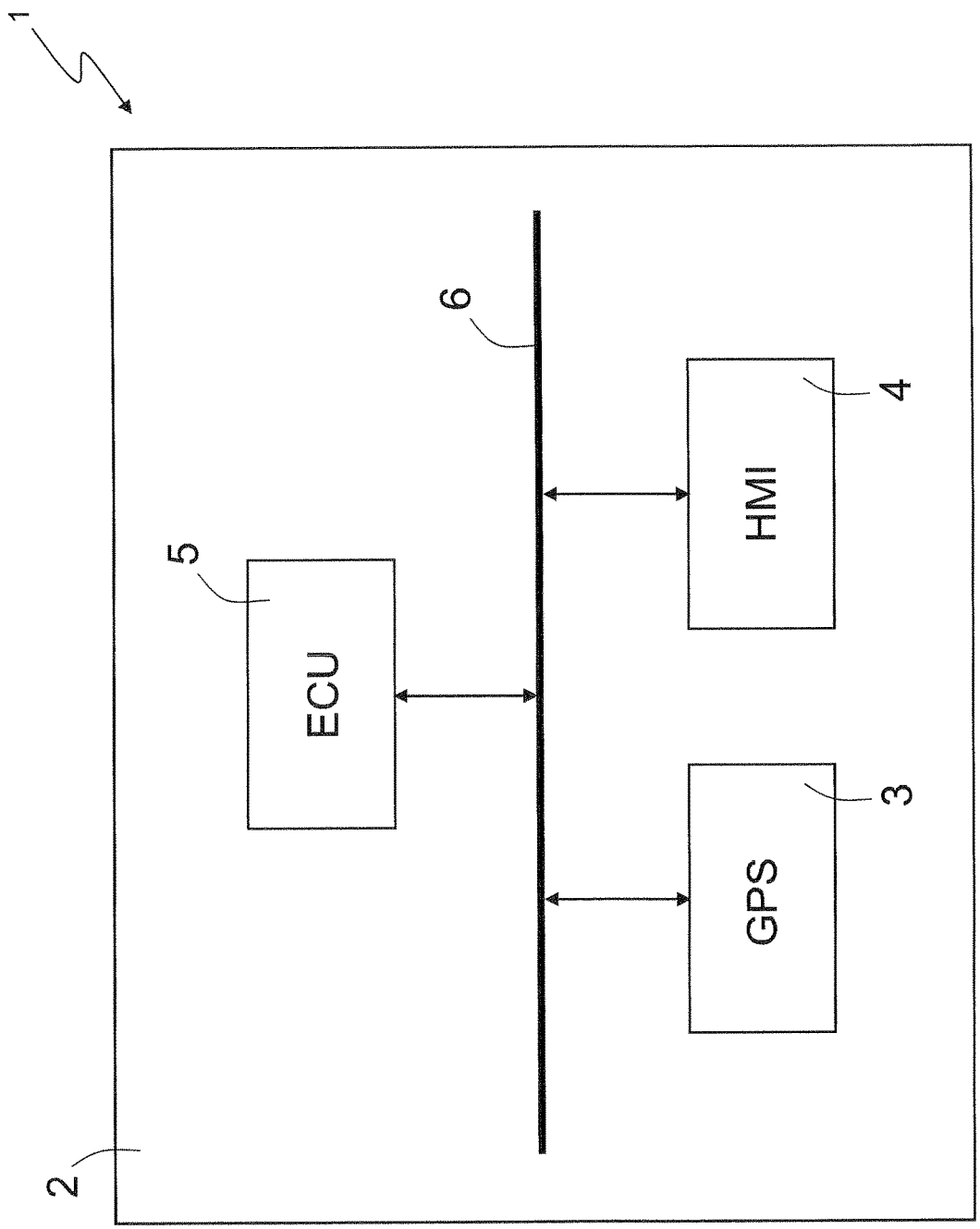

PREVENTIVE FUEL SAVING-AIMED MOTOR VEHICLE DRIVER ASSISTANCE

TECHNICAL FIELD OF INVENTION

The present invention relates to preventive fuel saving-aimed motor vehicle driver assistance, in particular a passenger road motor vehicle, such as a car, bus, camper van, etc., or a goods road motor vehicle, such as an industrial vehicle (lorry, lorry-trailer combination, articulated vehicle, etc.) or a light or medium-weight commercial vehicle (van, box truck, chassis cab, etc.).

STATE OF THE ART

The increase in public awareness of climatic changes and the introduction in many countries of $CO_2$ emission control legislation for passenger cars and commercial vehicles are forcing original equipment manufacturers (OEMs) and suppliers to improve the energy efficiency of vehicles through the use of sophisticated and expensive systems and components.

Unfortunately, however, even the most efficient vehicle produces large quantities of $CO_2$ if it used by a driver with an aggressive driving style and/or in unfavourable traffic conditions. As such, the measures or technologies that allow assessing driver behaviour and informing the driver on the most efficient route are able to offer significant improvements in terms of fuel consumption and reduction of $CO_2$ emissions.

Improved navigation systems (eco-navigation), systems that enable vehicles to communicate with other vehicles and/or with dedicated infrastructures, and systems able to suggest the most effective way of driving (eco-driving) have thus been proposed and which will play a significant role in the future in emission reduction thanks to the favourable cost-benefit ratio associated with them.

US 2012/0078496 A1 discloses an example of a preventive driver assistance system for a motor vehicle for the purpose of controlling fuel consumption, in which navigation data, situational awareness and driving style analysis are combined to provide recommendations for environmentally-friendly driving. In particular, the system combines visual and tactile feedback, especially in the form of a drive configuration, a display concept and/or a deceleration assistant, wherein the emphasis is, on the one hand, on a modified accelerator pedal characteristic and, on the other hand, on the eco-recommendations for interactive output of efficient driving instructions.

EP 1 973 078 A1 relates to an improvement in the driving efficiency of a vehicle by providing various indications to the vehicle's driver reflecting the driving efficiency, the indications being based on the comparison of currently recorded parameters and parameters recorded during previous drives of the same route or with parameters recorded by similar systems of other vehicles.

GB 2 432 437 A relates to a vehicle fuel consumption measurement system comprising a digital storage for storing information on the fuel consumption, and related to location. The system includes a fuel flowmeter installed between vehicle's fuel tank and engine. The information is stored for the duration of a predefined itinerary. A fuel consumption measurement method comprising: storing a vehicle fuel consumption rate; integrating over a specific path; multiplying by cost of fuel; tagging each path with information relating to a plurality of variables for each travel; storing information for the paths. A control center is used to monitor and advise a plurality of cars how to reduce fuel consumption.

SUBJECT AND ABSTRACT OF THE INVENTION

The preventive driver assistance system described in the aforesaid patent application needs to interface with automotive infotelematic equipment capable of providing a series of characteristics in the form of data and functions, such as digital maps, route data provided by an Advance Driver Assistance System (ADAS), a route computing function provided by a navigation system and a deceleration assistance function for the vehicle.

For this reason, the preventive driver assistance system described in the aforesaid patent application is destined to be installed only on vehicles fitted with high-level infotelematic systems capable of making all of these characteristics available.

The object of the present invention is therefore to provide a preventive motor vehicle driver assistance system that reduces dependence on the characteristics of the motor vehicle infotelematic systems, so as to allow its installation on motor vehicles fitted with lower level infotelematic systems as well, thus increasing the diffusion on motor vehicles, with consequent benefits in terms of reductions in fuel consumption and pollutant gas emissions.

According to the present invention, a preventive motor vehicle driver assistance system is provided, as defined in the appended claims.

BRIEF DESCRIPTION OF DRAWINGS

The attached FIGURE shows a block diagram of a driver assistance system for a motor vehicle according to the present invention.

DETAILED DESCRIPTION OF PREFERRED EMBODIMENTS OF THE INVENTION

The present invention will now be described in detail with reference to the attached FIGURES to allow an expert in the field to embody it and use it. Various modifications to the described embodiments will be immediately obvious to experts in the field, and the generic principles described herein can be applied to other embodiments and applications without leaving the scope of protection of the present invention, as defined in the appended claims. Therefore, the present invention should not be considered as limited to the embodiments described and illustrated herein, but is to be accorded the widest scope consistent with the principles and features disclosed and claimed herein.

In the attached FIGURE, reference numeral 1 indicates, as a whole, a preventive fuel saving-aimed motor vehicle driver assistance system for a motor vehicle 2 according to the present invention.

The driver assistance system 1 basically comprises:
- an on-vehicle locating device 3, conveniently of a satellite type;
- an automotive human-machine interface 4 comprising a graphical electronic display device and, optionally, an electronic visual indicator device and/or an electronic haptic indicator device;
- an electronic control unit 5 connected to the on-vehicle locating device 3 and to the automotive human-machine interface 4 by means of an automotive on-board communication network 6, for example, CAN, FlexRay or others, to receive and process data provided by the on-vehicle locating device 3 and provide the driver, by means of the automotive human-machine interface and based on the data provided by the on-vehicle locating device 3 and on motor vehicle-related data such as vehicle speed, fuel consumption, engaged gear, accelerator pedal and brake pedal positions, etc., with visual/audible/haptic driving assistance feedbacks, as described in detail hereinafter, which feedbacks, if put into practice by the driver, would result in fuel savings.

In particular, the electronic control unit 5 is programmed to execute a driver assistance software designed to identify the recurrent routes of the motor vehicle and provide the motor vehicle driver with feedbacks relating to the motor vehicle driving along the routes, feedbacks that, if put into practice by the driver, would result in a fuel consumption reduction and, in consequence, in pollutant emission reduction.

In particular, the driver assistance software is designed to execute, each motor vehicle journey, defined as the time period between a starting and subsequent switching off of the motor vehicle's engine, a number of functions, described in detail hereinafter, by means of which the identification of recurrent routes is achieved:

1. Waypoint Management, which comprises the following sub-functions:
   Waypoint Tracking
   Waypoint Matching
   Waypoint Learning
2. Route Management, which comprises the following sub-functions:
   Route Identification
   Route Organization
   Route Optimization
3. Driver Coaching With regard to the Waypoint Management function, broadly speaking, the Waypoint Tracking function is aimed at defining (in the sense of identifying/creating/selecting), along a route of the motor vehicle during a journey and based on data from the on-vehicle locating device 3, a succession of points, hereinafter referred to as Waypoints and indicated with WPs for brevity, which are used as references for vehicle navigation and are defined by primary attributes such as latitude, longitude and height above sea level and, optionally, by further secondary attributes, as described in greater detail hereinafter, and are defined (determined) along the motor vehicle route according to a dissemination criterion described in detail hereinafter.

In particular, values of a number of physical quantities, listed below, are determined and recorded at the WPs, these values defining the so-called attributes of the WPs, based on which the Route Management and Driver Coaching functions are then executed. As will become clearer from the ensuing description, each WP may belong to a number of routes and therefore may have different attributes for the different routes to which it belongs.

The attributes of each WP comprise:
Identifier
Geographic Attributes: latitude, longitude, height above sea level, and direction
Use: state (learning, optimization, etc.) and number of passages
Journey Attributes comprising:
   vehicle speed statistics in the WP, differentiated by time slot and WP crossing direction, and comprising percentile, conveniently quantized into discrete values 1, 5, 25, 50, 75, 95 and 99, and time percentage the motor vehicle is stationary in the WP;
   vehicle fuel consumption statistics in the WP, differentiated by time slot and WP crossing direction, and comprising average fuel consumption per time unit (liters/hour) and cut-off percentage; and, optionally,
   other on-vehicle system usage statistics, differentiated by time slot and WP crossing direction, such as low gear usage percentage in the WP, brake pedal usage percentage in the WP, etc.

The Waypoint Learning function is designed to update the WP attributes whenever the motor vehicle travels through them, except for the invariant ones, such as the Identifier and Geographic Attributes.

The Waypoint Matching function is designed to search, for each current motor vehicle position provided by the satellite localization system, typically at a frequency of 1 HZ, for the WP which is spatially closest to the current motor vehicle position and having certain characteristics. If such a WP is not found, then the Waypoint Tracking function is executed, by means of which a new WP is defined; otherwise, if such a WP is found, then the Waypoint Learning function is executed, by means of which the WP attributes are updated.

The search for the spatially closest WP is performed:
   based on a scoring function, in which the motor vehicle driving direction is included in the scoring criterion,
   only when the motor vehicle is in motion, as the travelling direction is unreliable if the motor vehicle is stationary,
   based on a threshold distance such that, if the search finds no WP with the necessary characteristics within this threshold distance, then a new WP is defined.

A scoring function for searching for the spatially closest WP could, for example, be the following one, based on Pythagoras' theorem:

$$D = \text{radq}((lat_v - lat_w)^2 + (long_v - long_w)^2 + (dir_v - dir_w)^2)$$

where D represents the score and is the distance between the current motor vehicle position and the WP considered, and where the subscripts v and w indicate the quantities related to the motor vehicle and to the WP, respectively.

Given that the search for the spatially closest WP performed by the Waypoint Matching function needs to be exhaustive, and therefore the computation of the scoring function can be computationally heavy, one or more of the following stratagems can be adopted to mitigate this burden:
   when computing the differences in latitude and longitude, only the WPs for which the difference in direction is less than 90° could be taken into consideration;
   defining partially overlapping geographical work areas, to be loaded separately; and
   defining preliminary selection criteria for WPs, for example, rejecting those that have differences in latitude or longitude greater than 500 meters or a directional difference exceeding 180°.

The WPs are disseminated along the motor vehicle route in accordance with a dissemination criterion based on the following three quantities, measured or computed starting from the last WP disseminated:
   elapsed time
   travelled distance, and
   route curvature.

In particular, the WP dissemination criterion contemplates that a new WP can be disseminated if all three of the quantities have values greater than corresponding minimum values, and is then actually disseminated when at least one of the quantities reaches a corresponding upper value.

Possible lower and upper values for the three quantities are listed in the following table:

| Quantity | Minimum Value | Maximum Value |
|---|---|---|
| Time [s] | 3 | 10 |
| Distance [m] | 25 | 200 |
| Curvature [l/m] | 0 | 25 |

Furthermore, given that the Waypoint Matching function is used not only in the Tracking phase, but also in the Coaching phase in order to identify the WP spatially closest to the current position of the vehicle for reference purposes, it is necessary that the dissemination criterion for the WPs along the route of the vehicle is such as to ensure that the Waypoint Matching function always returns a WP to refer to in the Coaching phase.

For this reason, a corresponding area of influence is associated with each WP, this area having a shape and size such that the areas of influence of adjacent WPs partially overlap.

Conveniently considering areas of influence of a circular shape centred on the related WPs and having radii equal to the maximum matching distance, defined as the maximum distance between a WP and the current motor vehicle position below which that WP is desired to be representative of the current motor vehicle position; in order for the areas of influence of adjacent WPs to be partially overlapping, it is necessary that the maximum distance between two adjacent WPs is less than twice the radius r of the areas of influence.

Conveniently, the motor vehicle speed statistics in the WPs, which form part of the attributes of the WPs, can be computed based on either the instantaneous motor vehicle speeds at the WPs or the average motor vehicle speeds in the corresponding areas of influence.

Passing now to the Route Management, the Route Identification function is designed to perform a concatenation of the WPs according to predetermined criteria so as to form an ordered list of WPs belonging to a same recurrent route.

These criteria substantially regard:
the sequence in which the WPs are defined, i.e. their progressive sequence number,
the distance between one WP and the next, such that beyond a certain value, the route is interrupted and the WP becomes the final WP, and
the "typical" sequence in which the WPs are matched during the journeys.

Attributes are then defined for each identified recurrent route, comprising:
Route Identifier
Route Name
Geographic Attributes: WPs belonging to the route, route start WP, route end WP, total distance, partial distances between adjacent WPs, gradients, etc.
Use: learning, optimization, etc.
Driver Attributes: average journey time, WP influence area crossing times, namely elapsed time from when the WP Matching function determines that a WP is the one closest to the current motor vehicle position to when it determines that another has become the closest WP to the current motor vehicle position, journey average fuel consumption, etc.
Optimized attributes: typically, the optimal speed profile and, in greater detail:
Optimal accelerator pedal position
Optimal gear
Total route travelling time constraints for the optimizer
Target speed, which is calculated on the basis of the other attributes of the WP and added to the attributes of the WP.

The Route Organization function is designed to identify and cleanse the route collection of:
route segments that are too short, for example, formed by single WPs or sequences of only two or three consecutive WPs, and
unused routes, or rather routes that are sufficiently long, but with too low a number of passages in relation to the time that has passed since these routes were defined.

The Route Optimization function is designed to identify characteristic points of the routes such as bends, roundabouts and traffic lights, compute the optimal speed profiles and primary controls for the motor vehicle at these characteristic points, and then compute the expected journey times and the expected fuel consumption along the routes.

The Route Optimization function is performed on a particular route only after the Learning phase has been completed for a sufficient number of WPs belonging to that route, namely when the number of passages for those WPs is greater than a certain threshold, for example, from a minimum of five to a maximum of twelve passages.

The identification of the characteristic points of the routes is performed by searching for the so-called minimum WPs, namely those WPs that satisfy a certain condition in terms of crossing speed, for example, those for which the $75^{th}$ percentile of the smoothed speed is less than the $75^{th}$ percentile of the smoothed speed of the previous WP and less than or equal to the $75^{th}$ percentile of the smoothed speed of the next WP. This condition can be reinforced by performing the following additional check, namely that the difference between the unsmoothed acceleration on exiting the WP considered measured on the 75th percentile (average acceleration from the WP considered to the next one) and the acceleration on entering (which is negative) exceeds a certain threshold, for example, 0.2 (in m/s$^2$).

Furthermore, in order to avoid finding false minimums at normal cruising speeds, above a certain WP crossing speed, for example 90 km/h, it does not make sense to search for minimums as WPs for which the 75th percentile smoothed speeds are greater than this threshold will never be classified as minimums.

In addition, to lighten the search for minimums, a check could also be made that the WP prior to that considered is not already a minimum, thereby avoiding, in the affirmative case, considering a WP following a minimum in the search for minimums. The identified minimum WPs are then classified in three categories, namely traffic lights, stop signs or tailbacks, and bends or roundabouts.

In particular, the WPs that correspond to traffic lights are determined first, after which those that correspond to stop signs or tailbacks are searched for among the minimum WPs, namely those for which the $75^{th}$ percentile of the speed in lower than or equal to a predetermined threshold, for example km/h, and, lastly, the remaining. WPs are classified as bends or roundabouts.

Computation of the optimal speed profiles and primary controls for the motor vehicle at the characteristic points of the routes, as well as the expected journey times and the expected fuel consumption along the routes, is carried out based on the attributes of the WPs of the routes, typically the speeds of crossing the routes and their characteristic points, vehicle parameters such as the run-down curve (deceleration curve of the vehicle with the accelerator pedal released and gear engaged) or the power of the vehicle, and where the following attributes of each WP are considered:

Header: Tmin (sec) Tmax (sec): Total route travelling time constraints for the optimizer
Identifiers of the WPs
Partial distances between successive WPs
Heights above sea level (for calculating gradients)
Target speed
Approximate curvature.

Additional quantities relating to the WPs that could be used to refine the calculation include:

Speed profile at $25^{th}$ percentile
Speed profile at $75^{th}$ percentile
whether the WP is low speed, high speed or transitional
whether the vehicle enters the WP in deceleration, in acceleration or at a substantially constant speed with respect to the previous or next WP
type of minimum: traffic lights, stop sign or bend.

Feedback on the optimal speed profiles and primary controls for the motor vehicle at the characteristic points of the routes, as well as the expected journey times and the expected consumption along the routes could, for example, be provided in the following manner, with a certain spatial resolution (rate), for example, every 5 meters travelled by the motor vehicle:

Identifiers of the WPs (to facilitate Waypoint Matching)
Progressive distance
Optimal speed
Gear to use
Percentage of torque to output
Brake usage flag
Cumulative fuel utilization The Driver Coaching function is then executed based on the optimal speed profiles and the primary controls for the motor vehicle at the characteristic points of the routes, which, through the motor vehicle human-machine interface, provides the driver with visual and/or audible and/or haptic motor vehicle driving recommendations that, if put into practice by the driver, would result in more efficient or environmentally-friendly motor vehicle driving.

The visual recommendations can be provided to the driver by displaying messages of the type "slow down" or "remove foot from accelerator pedal", also in combination with "speed limit ahead" or "bend ahead" and/or further coloured indicators or message flashing, or by displaying dedicated icons, for example, an icon depicting a foot raised from the accelerator pedal, or an icon depicting a speed limit road sign, etc.

The invention claimed is:

1. A fuel saving-aimed motor vehicle driver assistance system comprising:
an on-vehicle location device configured to provide motor vehicle position-related data;
a human-machine interface configured to provide a motor vehicle driver recommendations to a motor vehicle driver which would result in fuel savings; and
an electronic control unit connected to the on-vehicle location device and the human-machine interface by a communication network, the electronic control unit being configured to identify recurrent routes of the motor vehicle and provide the motor vehicle driver, via the human-machine interface, feedback relating to the motor vehicle by implementing the following functions:
Waypoint Management comprising:
Waypoint Tracking,
Waypoint Matching, and
Waypoint Learning;
Route Management comprising:
Route Identification, and
Route Optimization;
Driver Coaching;
wherein the Waypoint Tracking function defines, based on motor vehicle position-related data received from the on-vehicle location device, a succession of Waypoints, which are geographic points that define each recurrent route, at which values of a series of Waypoint attributes are determined and recorded, and based on which the Route Management function is then executed;
wherein the Waypoint attributes comprise:
invariant Waypoint attributes comprising Waypoint location data, and
variable Waypoint attributes comprising Waypoint crossing direction and speed, and motor vehicle status data comprising motor vehicle speed data, motor vehicle fuel consumption data and on-vehicle system usage data;
wherein the Waypoint Learning function updates the variable Waypoint attributes when the motor vehicle travels through the Waypoints;
wherein the Waypoint Matching function reduces computational load of the electronic control unit by searching the Waypoints for a closest Waypoint that is spatially closest to the current motor vehicle position and having predetermined Waypoint crossing direction and speed and predetermined distance from the current motor vehicle position, and using a scoring function which adopts at least one of the following functions to reduce computational load;
computing differences in latitude and longitude only for Waypoints for which the difference in direction is less than ninety degrees;
defining partially overlapping geographical work areas, to be loaded separately; and
rejecting Waypoints that have differences in latitude and longitude greater than five-hundred meters or a directional distance exceeding one-hundred eighty degrees;
wherein if such a closest Waypoint is not found, the Waypoint Tracking function is then executed to define a new Waypoint, or else, if such a closest Waypoint is found, the Waypoint Learning function is then executed to update the variable Waypoint attributes;
wherein the Route Identification function concatenates the Waypoints associated with a each recurrent route so as to form an ordered list of Waypoints associated with to each recurrent route;
wherein the Route Optimization function identifies characteristic route Waypoints that satisfy a predetermined Waypoint crossing speed condition, compute speed profiles and primary controls for the motor vehicle at the characteristic route Waypoints and expected journey times and fuel consumption along the recurrent routes based on the Waypoint attributes;
and wherein the Driver Coaching function provides the motor vehicle driver, based on the speed profiles and the primary controls computed for the characteristic route Waypoints and by means of the human-machine interface, with fuel saving-aimed motor vehicle driving recommendations along the recurrent routes.

2. The fuel saving-aimed motor vehicle driver assistance system of claim 1, wherein the Waypoint Tracking function determines new Waypoints in accordance with a dissemination criterion based on the following three quantities, measured or computed from the last Waypoint determined:

elapsed time travelled distance, and route curvature.

3. The fuel saving-aimed motor vehicle driver assistance system of claim 2, wherein the Waypoint Tracking function determines at least one of the new Waypoints when all three quantities have values greater than corresponding minimum values, and when at least one of the corresponding quantities reaches a corresponding upper value.

4. The fuel saving-aimed motor vehicle driver assistance system of claim 1, wherein the Waypoint Tracking function associates a corresponding area of influence with each of the Waypoints having a shape and size such that the areas of influence of adjacent Waypoints partially overlap, so that the Waypoint Matching function implemented during the Driver Coaching phase in order to identify the closest Waypoint always returns a reference Waypoint.

5. The fuel saving-aimed motor vehicle driver assistance system of claim 4, wherein each area of influence has a circular shape centered on the respective Waypoint, has radius r equal to the maximum matching distance, defined as the maximum distance between the respective Waypoint and the current motor vehicle position below which the respective Waypoint is desired to be representative of the current motor vehicle position, and the maximum distance d between two adjacent Waypoints is lower than twice the radius r of the areas of influence.

6. The fuel saving-aimed motor vehicle driver assistance system of claim 1, wherein the Waypoint Matching function searches for the closest Waypoint:

based on a scoring function, in which the direction of travel of the motor vehicle is included in the scoring criterion, only when the motor vehicle is in motion, and based on a threshold distance such that, if the search finds no Waypoint with the necessary characteristics within this threshold distance, then a new Waypoint is defined.

7. The fuel saving-aimed motor vehicle driver assistance system of claim 1, wherein Waypoint attributes comprise:

Identifier

Geographic Attributes: latitude, longitude, height above sea level, and direction Use: status (learning, optimization) and number of passages of the motor vehicle in the Waypoint Journey Attributes comprising:

motor vehicle speed statistics in the respective Waypoint differentiated by time slot and Waypoint crossing direction and comprising percentile and time percentage the motor vehicle is stationary in the respective Waypoint; and vehicle fuel consumption statistics in the respective Waypoint differentiated by time slot and Waypoint crossing direction and comprising average fuel consumption per unit time and cut-off percentage.

8. The fuel saving-aimed motor vehicle driver assistance system of claim 1, wherein the Waypoint Learning function terminates when the number of passages of the motor vehicle through the Waypoints is greater than a certain threshold.

9. The fuel saving-aimed motor vehicle driver assistance system of claim 1, wherein the Route Optimization function is executed for a respective recurrent route only after the Waypoint Learning function has been completed for a predetermined number of Waypoints belonging to the respective route.

10. The fuel saving-aimed motor vehicle driver assistance system of claim 1, wherein the Route Identification function is designed to perform a concatenation of the Waypoints associated with a respective recurrent route based on:

sequence in which the Waypoints are defined, i.e. their progressive sequence number, distance between one Waypoint and the next one, such that beyond a certain value, the recurrent route is interrupted and a Waypoint becomes a final Waypoint, and typical sequence in which the Waypoints are matched during the journeys.

11. The fuel saving-aimed motor vehicle driver assistance system of claim 1, wherein the Route Identification function computes attributes of each identified recurrent route comprising:

Route Identifier

Route Name

Geographic Attributes, comprising at least one selected from the group of Waypoints belonging to the recurrent route, route start Waypoint, route end Waypoint, total distance, partial distances between adjacent Waypoints and gradients Use, comprising at least one selected from the group of learning and optimization Driver Attributes, comprising at least one selected from the group of average journey time, Waypoint influence area crossing times, namely elapsed time from when Waypoint Matching function determines that a Waypoint is the one closest to the current the motor vehicle position to when it determines that another one has become the closest Waypoint to the current the motor vehicle position and journey average fuel consumption, and Optimized attributes, comprising at least one selected from the group of:

optimal accelerator pedal position, and optimal gear.

12. The fuel saving-aimed motor vehicle driver assistance system of claim 1, wherein the Route Management function comprises the following function:

Route Organization, which identifies and cleanses the route collection of route segments that are too short.

13. The fuel saving-aimed motor vehicle driver assistance system of claim 1, wherein the Route Optimization function identifies characteristic route Waypoints by searching for minimum Waypoints that satisfy a predetermined condition in terms of Waypoint crossing speed.

14. A motor vehicle comprising the fuel saving-aimed motor vehicle driver assistance system of claim 1.

* * * * *